United States Patent
Tsuji et al.

(10) Patent No.: US 7,884,906 B2
(45) Date of Patent: Feb. 8, 2011

(54) SUBSTRATE FOR LIQUID CRYSTAL DISPLAY AND LIQUID CRYSTAL DISPLAY UNIT

(75) Inventors: Masayuki Tsuji, Matsusaka (JP); Toshihide Tsubata, Tsu (JP); Yuhko Hisada, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 294 days.

(21) Appl. No.: 11/569,710

(22) PCT Filed: May 26, 2005

(86) PCT No.: PCT/JP2005/010098
§ 371 (c)(1),
(2), (4) Date: Apr. 25, 2007

(87) PCT Pub. No.: WO2005/116743
PCT Pub. Date: Dec. 8, 2005

(65) Prior Publication Data
US 2007/0216850 A1      Sep. 20, 2007

(30) Foreign Application Priority Data
May 28, 2004   (JP)   ............... 2004-160116

(51) Int. Cl.
*G02F 1/1337* (2006.01)
(52) U.S. Cl. ............... 349/129; 349/123; 349/128
(58) Field of Classification Search ............ 349/129, 349/123
See application file for complete search history.

(56) References Cited

U.S. PATENT DOCUMENTS

| | | | |
|---|---|---|---|
| 6,671,020 B2 * | 12/2003 | Kim et al. | 349/129 |
| 6,710,833 B2 | 3/2004 | Wang | |
| 6,778,249 B1 * | 8/2004 | Kamosawa et al. | 349/153 |
| 6,897,929 B2 * | 5/2005 | Takeda et al. | 349/129 |
| 7,145,622 B2 * | 12/2006 | Kataoka et al. | 349/143 |
| 7,206,048 B2 * | 4/2007 | Song | 349/129 |
| 7,405,789 B1 | 7/2008 | Sasaki et al. | |
| 2001/0019391 A1 * | 9/2001 | Kim et al. | 349/139 |

(Continued)

FOREIGN PATENT DOCUMENTS

EP       0884626 A       12/1998

(Continued)

OTHER PUBLICATIONS

Official communication issued in the corresponding international application No. PCT/JP2005/010098, mailed on Nov. 29, 2006.

(Continued)

*Primary Examiner*—Rhonda S Peace
(74) *Attorney, Agent, or Firm*—Keating & Bennett, LLP

(57) ABSTRACT

It is an object of the present invention to provide a substrate for liquid crystal display by means of which a generation of air bubbles in a liquid crystal layer after charging a liquid crystal can be prevented, and a liquid crystal display having a good display quality level can be obtained at a high yield, and to provide a liquid crystal display unit provided with such substrate for liquid crystal display. The present invention is directed to a substrate for liquid crystal display, comprising a projection for controlling alignments of liquid crystal molecules, wherein a slit is provided in the projection for controlling alignments of liquid crystal molecules.

9 Claims, 6 Drawing Sheets

U.S. PATENT DOCUMENTS

| | | | |
|---|---|---|---|
| 2003/0107687 A1* | 6/2003 | Choo et al. | 349/39 |
| 2004/0090582 A1* | 5/2004 | Ikeda et al. | 349/130 |
| 2005/0128397 A1 | 6/2005 | Sasaki et al. | |
| 2006/0017865 A1* | 1/2006 | Tsubata et al. | 349/106 |
| 2007/0040974 A1* | 2/2007 | Ninomiya et al. | 349/129 |

FOREIGN PATENT DOCUMENTS

| | | |
|---|---|---|
| EP | 0987582 A | 3/2000 |
| JP | 08-20627 B | 3/1996 |
| JP | 11-174477 A | 7/1999 |
| JP | 11-242225 A | 9/1999 |
| JP | 2000-155317 A | 6/2000 |
| JP | 2001-66615 A | 3/2001 |
| JP | 2002-040433 A | 2/2002 |
| JP | 2002-107740 A | 4/2002 |
| JP | 2002-214614 A | 7/2002 |
| JP | 2002-287145 A | 10/2002 |
| TW | 485264 B | 5/2002 |
| TW | 536653 B | 6/2003 |

OTHER PUBLICATIONS

Official communication issued in the corresponding International Application No. PCT/JP2005/010098, mailed on Jul. 12, 2005.
Official Communication issued in corresponding Taiwanese Patent Application No. 094113344, mailed Aug. 27, 2009.

* cited by examiner

SUBSTRATE FOR LIQUID CRYSTAL DISPLAY AND LIQUID CRYSTAL DISPLAY UNIT

BACKGROUND OF THE INVENTION

1. Field of the Invention

The present invention relates to a substrate for liquid crystal display and a liquid crystal display unit, and more particularly to a substrate for liquid crystal display used suitably for a MVA (multi-domain Vertical Alignment) type liquid crystal display and a liquid crystal display unit provided therewith.

2. Description of the Related Art

Since a liquid crystal display has advantages of compact, thin, a low consumption of electric power, and light-weight, it is widely used for a variety of electronics devices at present. Particularly, an active matrix type liquid crystal display containing switching devices is widely adopted for business machines such as a personal computer, audio-video equipment such as TV, cellular phone and the like. In such liquid crystal displays, improvements in quality levels such as growing in size, high-definition, increase in a ratio of pixel effective area (high aperture ratio), wide visual field, and increase in color purity develop rapidly in recent years.

A schematic structure of a liquid crystal display is such that a liquid crystal is sandwiched in between an active matrix substrate and a color filter substrate located so as to be opposed to each other, and plastic beads disposed between the substrates or a columnar resin structure provided on the color filter substrate and the like are used as a spacer, whereby a thickness (a cell gap or a cell thickness) of a liquid crystal layer is maintained.

In recent years, there is such a tendency that improvements in a speed of response and visual properties (a wide angle of field) are strongly requested particularly as a performance of a liquid crystal display used in a TV with big video screen and the like. As a technology satisfying such needs, a MVA type liquid crystal display unit is disclosed (for example, (see pages 1 to 3, 21, and 66 as well as FIG. 44) of Japanese Patent Application Laid-Open No. 11-242225). In such MVA type liquid crystal display unit, projections (those for an alignment control) for controlling pre-tilts of liquid crystal molecules or electrode slits are usually provided on a surface of substrates. For instance, slits are provided on a pixel electrode (ITO; indium tin oxide) of an active matrix substrate, while a projection row is provided on a color filter substrate in Japanese Patent Application Laid-Open No. 11-242225 (see the sixth embodiment and FIG. 44). When pre-tilts are given to vertically aligned liquid crystal molecules by providing these projections or electrode slits on surfaces of the respective substrates, alignment directions of the liquid crystal molecules are divided, field angle characteristics are improved, and in addition, a speed of response in the liquid crystal molecules can be improved. Furthermore, in Japanese Patent Application Laid-Open No. 11-242225, there are disclosed a structure wherein electrode slits are provided on both of a pixel electrode of the active matrix substrate and an electrode of the color filter substrate, and a structure wherein projections are provided on both the substrates, respectively.

On one hand, when a liquid crystal panel is manufactured, a seal resin is applied around a periphery of inner surfaces opposed to two opposed substrates of an active matrix substrate and a color filter substrate, the substrates are bonded to each other to maintain a gap in between the substrates, and further, it is required to charge a liquid crystal inside the seal providing the gap. As a manner for charging a liquid crystal in between substrates, a (vacuum) pouring method is heretofore employed in general. In the pouring method, a liquid crystal cell formed by bonding two substrates with a seal is maintained in vacuum in a vacuum chamber, air in the liquid crystal cell is excluded, then, the interior of the chamber is returned to normal pressures in a state where an inlet provided on a part of the seal in the liquid crystal cell is immersed into a container in which a liquid crystal is stored, thereby spreading the liquid crystal into the liquid crystal cell, and thereafter, the inlet is sealed with a resin to charge the liquid crystal into the liquid crystal cell.

In such pouring method, however, a period of time for pouring a liquid crystal is prolonged in case of manufacturing a jumboized liquid crystal panel used in a TV with big video screen and the like. For this reason, such a technology that a sealing resin (sealing agent) disposed on a surface of either substrate of two substrates in a rectangular-shaped frame or the like, a liquid crystal is dropped inside of the frame, the resulting substrate is bonded to the other substrate, and the sealing resin is solidified has been developed (for example, see Japanese Patent Publication No. 8-20627 (page 1)). Such method for charging a liquid crystal as mentioned above is called generally "(liquid crystal) drop filling method" in order to discriminate it from a "pouring method", and accordingly, the former method is getting a very important technology in manufacturing a liquid crystal panel with big video screen.

The above-mentioned MVA type liquid crystal display unit is suitably used for a TV with big video screen. In this connection, when the MVA type liquid crystal display unit is manufactured in accordance with drop filling method, its producibility can be improved. In case of the MVA type liquid crystal display unit, however, there are a vertical alignment film and projections for controlling an alignment, so that a flow resistance of a liquid crystal becomes higher in the vicinities of the alignment film than that of an alignment film for a TN (twisted nematic) type liquid crystal unit, and further, the projections for alignment control become a barrier with respect to fluid flow of the liquid crystal. Moreover, a vertical alignment type liquid crystal used in the MVA type liquid crystal display unit has usually a higher viscosity than that of the TN type liquid crystal. For this reason, when drop filling method is applied, a generation of vacuum air bubbles (remaining air bubbles) due to insufficient extension of the liquid crystal is more remarkably observed in the MVA type liquid crystal display unit than that of the TN type liquid crystal display unit. In this respect, there is room for improvement in filling method with respect to the MVA type liquid crystal display unit.

Some kinds of technology are disclosed as countermeasures for air bubbles in one drop filling method (for example, see Japanese Patent Application Laid-Open No. 2002-107740 (page 1), Japanese Patent Application Laid-Open No. 11-174477 (page 1), and Japanese Patent Application Laid-Open No. 2001-66615 (page 1). However, JP-A No. 2002-107740 relates to a technology for preventing a generation of remaining air bubbles due to an insufficient amount of a liquid crystal, and further, JP-A Nos. 11-174477 and 2001-66615 relate to a technology for preventing a generation of remaining air bubbles due to production of a gas from a color filter substrate. Any of the above-described technologies does not relate to that for improving extension of a liquid crystal.

SUMMARY OF THE INVENTION

The present invention has been made in view of the actual status as mentioned above, and an object of the present invention is to provide a substrate for liquid crystal display by means of which a generation of air bubbles in a liquid crystal layer after charging a liquid crystal can be prevented, and a liquid crystal display having a good display quality level can be obtained at a high yield, and to provide a liquid crystal display unit provided with such substrate for liquid crystal display.

As a result of a variety of studies by the present inventors with respect to a substrate for liquid crystal display by which a generation of air bubbles in a liquid crystal layer of a MVA type liquid crystal display can be prevented, the inventors aimed at projections for alignment control provided on a substrate in case of manufacturing the MVA type liquid crystal display in accordance with a drop filling method. The present inventors have found that projections for alignment control become a barrier, it results in insufficient extension of a liquid crystal dropped on a substrate, so that vacuum air bubbles generate. In this respect, it has been found that provision of slits in alignment control projections can prevent a generation of air bubbles. For instance, when slits 23 are partially provided in projections 22 for orientation control as shown in FIG. 1, a passage for extending a liquid crystal may be assured, whereby it has been found that a generation of vacuum air bubbles can be prevented. Thus, the above-described problems may be successfully solved, and the present invention has been completed.

Namely, the present invention relates to a substrate for liquid crystal display, comprising a projection for controlling alignments of liquid crystal molecules, wherein a slit is provided in the projection for controlling alignments of liquid crystal molecules.

DETAILED DESCRIPTION OF PREFERRED EMBODIMENTS

Figure 1:
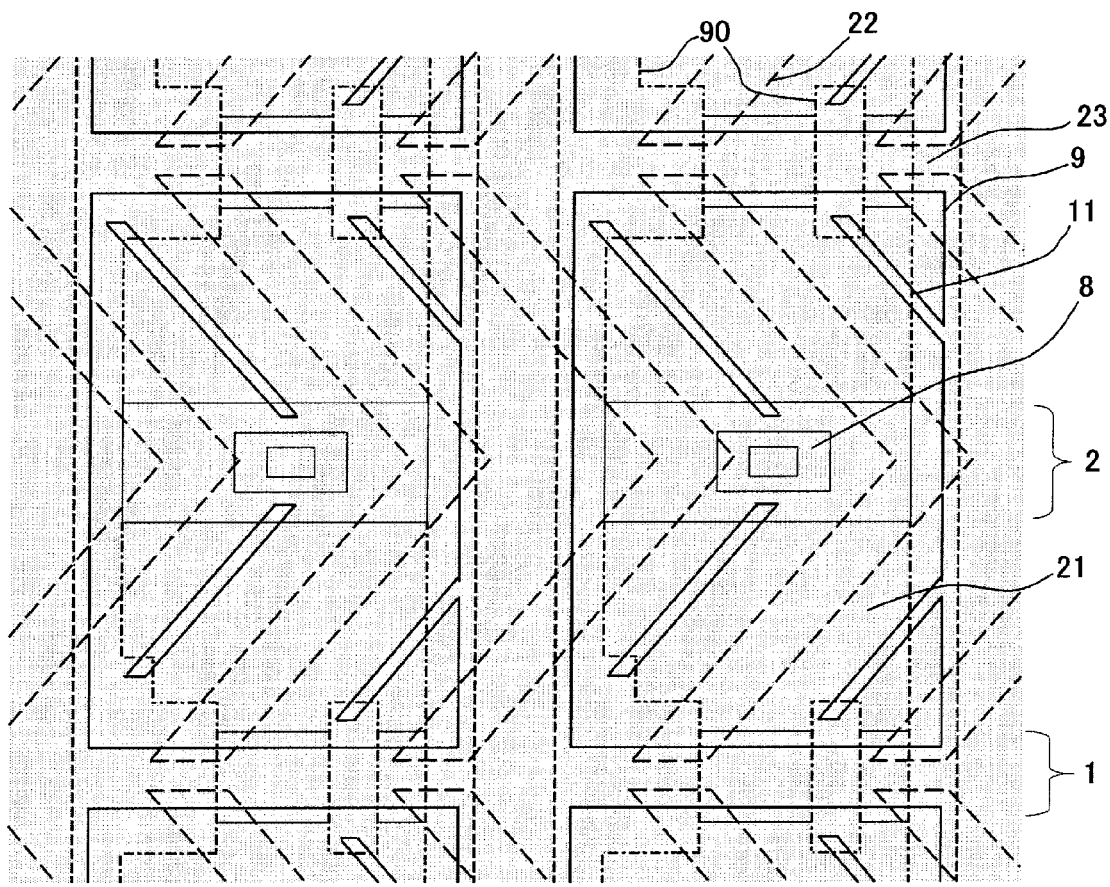
FIG. 1 is a plan view showing schematically a part (two pixels) of a liquid crystal panel according to an embodiment 1 of the present invention.

A substrate for liquid crystal display according to the present invention is provided with a projection for controlling alignments of liquid crystal molecules (hereinafter referred optionally to as "orientation control projection"). Structures, materials, sizes, shapes and the like of the projection for controlling alignments of liquid crystal molecules is not specifically limited so far as the projection has substantially a function for controlling an alignment condition of liquid crystal molecules constituting a liquid crystal layer being in contact with a substrate for liquid crystal display. The projection for controlling alignments of liquid crystal molecules may be prepared by, for example, applying a positive type phenol novolak-based photosensitive resin solution in accordance with a spin coat method, drying, and then exposing and developing a target coat by using a photomask.

The projection for controlling alignments (alignment control projection) is provided with slit in the present invention. The Slit is not specifically limited so far as they may be served as a passage through which a liquid crystal is allowed to spread over the whole of a substrate surface of a substrate for liquid crystal display in case of charging the liquid crystal. A cross-sectional shape, a substrate plane shape (plane pattern), a width, a depth and the like of the substrate for liquid crystal display are properly determined in response to a required constitution thereof. As a result, in accordance with the present invention, a liquid crystal can be allowed to spread sufficiently over whole the substrate plane in case of charging the liquid crystal, whereby the invention can achieve advantageous effects for preventing an appearance of defective air bubbles in a liquid crystal layer.

A substrate for liquid crystal display of the invention is provided with a projection for controlling alignments of liquid crystal molecules, and usually it is employed in a MVA type liquid crystal display unit. Since such MVA type liquid crystal display unit is suitable for TV and the like with big video screen, a drop filling method is principally used as a manner for charging a liquid crystal in case of manufacturing a liquid crystal panel by the use of the substrate for liquid crystal display of the invention. The present invention attains advantageous effects for improving an extension of liquid crystal in case of charging a liquid crystal in accordance with such drop filling method. However, the present invention is also applicable for charging a liquid crystal in accordance with a pouring method, and in this case also, the invention can achieve advantageous effects for improving an extension of the liquid crystal.

A substrate for liquid crystal display of the invention is not specifically limited, but it may or may not contain constitutional elements other than that as described above so far as the substrate is constituted with the above-described constituents as its indispensable ones.

A preferred embodiment of a substrate for liquid crystal display according to the invention will be described in detail hereinafter.

The above-described alignment control projection is divided preferably into two or more areas when respective pixel electrodes are viewed from a vertical direction in a substrate plane. As a manner for dividing pixel electrodes, either a manner divided by continuous alignment control projection without accompanying any discontinuity, or a manner divided by discontinuous alignment control projection with accompanying discontinuities is applicable for the invention.

In such a configuration of the orientation control projection, the slit for the alignment control projection is particularly effective for spreading a liquid crystal over the whole of a substrate plane in case of charging the liquid crystal to decrease an appearance of defective air bubbles in the liquid crystal layer. The number for dividing a pixel electrode by alignment control projection is preferably two or more and four or less, and more preferably four.

An expression "when viewed from a vertical direction in a substrate plane" means that "when orthographs of objects are viewed in a substrate plane", and more specifically means that "when an assemblage of feet of perpendiculars extend downwards from respective points of targets to the substrate plane".

It is preferred that the alignment control projection has a repeated V-shaped configuration viewed from a vertical direction in a substrate plane. Also in a configuration wherein the alignment control projection has such a pattern (planar configuration) as described above, the slit provided for the alignment control projection is particularly effective for spreading a liquid crystal over the whole of a substrate plane in case of charging the liquid crystal to decrease an appearance of defective air bubbles in a liquid crystal layer.

It is preferred that the above-described slit is located at sites overlapping substantially at least one wiring selected from the group consisting of a wiring for scanning signals, a wiring for data signals, and a wiring for storage capacitors viewed from a vertical direction in a substrate plane. Namely, preferable are in the present invention, when viewed from a vertical direction in a substrate plane, (1) a configuration wherein the slit is located at a site overlapping the wiring for scanning signals, (2) a configuration wherein the slit is located at a site overlapping the wiring for data signals, (3) a configuration wherein the slit is located at a site overlapping the wiring for storage capacitors, (4) a configuration wherein the slit is located at a site overlapping the wiring for scanning signals, and further the slit is located at a site overlapping the wiring for data signals, (5) a configuration wherein the slit is located at a site overlapping the wiring for scanning signals, and further the slit is located at a site overlapping the wiring for storage capacitors, and (6) a configuration wherein the slit is located at a site overlapping the wiring for data signals, and further the slit is located at a site overlapping the wiring for storage capacitors.

In these configurations (1) to (6), since the slit may be provided in non-display regions, it can prevent to appear display irregularity and the like in a liquid crystal display caused by abnormal alignments in a liquid crystal layer due to provision of the slit.

The above-described wiring for scanning signals is that for supplying scanning signals for driving control of switching devices such as thin film transistors to a gate electrode of each switching device, and which is called also a gate wiring. The wiring for data signals is that for supplying data signals for driving control of pixel electrodes to a source electrode of each switching device, and which is called also a source wiring. The wiring for storage capacitors is that disposed so as to be opposed to storage capacitor electrodes provided in every pixels through an insulating film, and which constitutes a storage capacitor device therewith. A configuration in a substrate plane (planar pattern), a sectional shape, a width, a thickness and the like of these wirings may be determined properly in response to a constitution of a substrate for liquid crystal display, and they are not specifically limited. A material for the wirings is not specifically limited so far as it is a conductive material, but a Ti/Al/Ti laminated film, and a metallic film of Al/Ti or the like is preferable. As a manner for forming such wirings, a preferably applied method is that a metallic film is deposited by means of sputtering, then, a resist pattern is formed in accordance with a photolithography method, and dry etching is made by using an etching gas such as a chlorine-based gas to exfoliate the resist.

It is to be noted that an expression "viewed from a vertical direction in a substrate plane" means that orthographs of a wiring in the substrate plane overlap substantially orthographs of a slit in the above-described configurations (1) to (6).

Furthermore, an expression "a site overlapped substantially" corresponds preferably to a site judged as a site which overlap actually, but fringe thereof may be contained, when there is an effect for preventing adverse affects on a display quality in liquid crystal display of a possible abnormal alignment by a provision of a slit in a liquid crystal layer.

Moreover, a liquid crystal panel is usually composed of two opposed substrates for a liquid crystal display. In the present invention, however, there may be such a configuration wherein both a wiring and an alignment control projection having slit are formed on either or both of substrates, or such a configuration wherein a wiring is formed on either of the substrates, while alignment control projection having slit is formed on the other substrate. In the case where the wiring and the alignment control projection having the slit are formed on different substrates, "a site overlapping substantially" are determined in a condition wherein two opposed substrates are bonded to each other so as to constitute a liquid crystal panel.

The above-described slit is preferably located at a site overlapping substantially black matrix viewed from a vertical direction in a substrate. In this configuration also, since the slit is disposed in a non-display region, it can be prevented from adverse affects on a display quality in liquid crystal display of an abnormal alignment caused by a provision of the slit in a liquid crystal layer. A configuration in a substrate plane (planar pattern), a thickness, a material and the like of a black matrix may be determined properly in response to a constitution of a substrate for liquid crystal display, and they are not specifically limited. Such a black matrix may be formed by applying an acryl-based photosensitive resin solution of a negative type into which carbon fine particles are dispersed onto a substrate in accordance with a spin coat method, drying the resulting film to obtain a black photosensitive resin layer, and then, exposing it through a photomask and developing the resulting product.

A liquid crystal panel is usually composed of two opposed substrates for liquid crystal display. In the present invention, however, there may be such a configuration wherein both a black matrices and an alignment control projection having slit are formed on either or both of substrates, or such a configuration wherein a black matrix is formed on either of the substrates, while an alignment control projection having slit is formed on the other substrate. In the case where the black matrix and the alignment control projection having the slit are formed on different substrates, "a site overlapping substantially" are determined in a condition wherein two opposed substrates are bonded to each other so as to constitute a liquid crystal panel.

Concerning the above-described slit, at least one slit is preferably provided per a pixel, whereby such advantageous effects of the present invention that a liquid crystal is allowed to spread sufficiently over the whole surface of a substrate plane in case of charging the liquid crystal, and as a result, an appearance of defective air bubbles in a liquid crystal layer is prevented can be more effectively achieved.

Moreover, it is preferred to provide the same number of slits per a pixel, whereby a display irregularity in each pixel can be prevented to obtain a liquid crystal display of an excellent display quality.

A preferred example of the above-described substrate for liquid crystal display includes a color filter substrate having colored color filter layers of at lest three primary colors, and an active matrix substrate. Any of these substrates is suitably used in a liquid crystal display.

A color filter substrate is not specifically limited, so far as the substrate has optically colored functions based on which a color display becomes possible in a liquid crystal display. A configuration in a substrate plane (planar pattern), a thickness and the like of the colored color filter layer may be determined properly in response to a constitution of a substrate for liquid crystal display, and they are not specifically limited. However, three colored color filter layers of red, green, and blue are usually juxtaposed in every pixel on a substrate as colored layers. As a material for the colored color filter layers, a clear resin containing dyes or pigments and the like is preferably used. Colored color filter layers may be formed in every color by, for example, applying an acryl-based photosensitive resin solution of a negative type into which a pigment is dispersed in accordance with a spin coat method to a substrate, drying the resulting film, then, exposing the dried film through a photomask and developing the resulting product.

An active matrix substrate is not specifically limited, so far as it is a substrate wherein switching devices (active elements) are formed in a matrix-shaped in response to respective pixels in a liquid crystal display.

The present invention relates also to a liquid crystal display unit provided with a substrate for liquid crystal display of the invention. In the liquid crystal display unit, the substrate for liquid crystal display of the invention is used for at least either of substrates constituting a liquid crystal panel, whereby a generation of air bubbles is prevented in a liquid crystal layer, a good display quality can be obtained, and an yield can be improved.

The liquid crystal display unit according to the present invention is provided with a substrate for liquid crystal display of the invention containing a projection for controlling an alignment of liquid crystal molecules for at least either of substrates constituting a liquid crystal panel, so that it is suitably used as a MVA type liquid crystal display unit.

According to a substrate for liquid crystal display of the invention, since a slit is provided in alignment control projection, a generation of air bubbles due to remaining vacuum in a liquid crystal layer caused by an insufficient extension of a liquid crystal in case of charging the liquid crystal can be suppressed, so that a liquid crystal display unit having a good display quality can be obtained at a high yield. Particularly, a drop filling method is indispensable in case of manufacturing a liquid crystal panel with big video screen constituting a MVA type liquid crystal display unit and the like by which a wide angle of field is obtained. In this respect, according to the substrate for liquid crystal display of the invention, it is possible to manufacture a liquid panel with big video screen at a high yield in accordance with the drop filling method without generating air bubbles, so that a good display quality can be achieved.

In the following, embodiments of the invention will be described in more detail by referring to the accompanying drawings. It is, however, to be noted that the present invention is not limited thereby.

Embodiment 1

Figure 2:
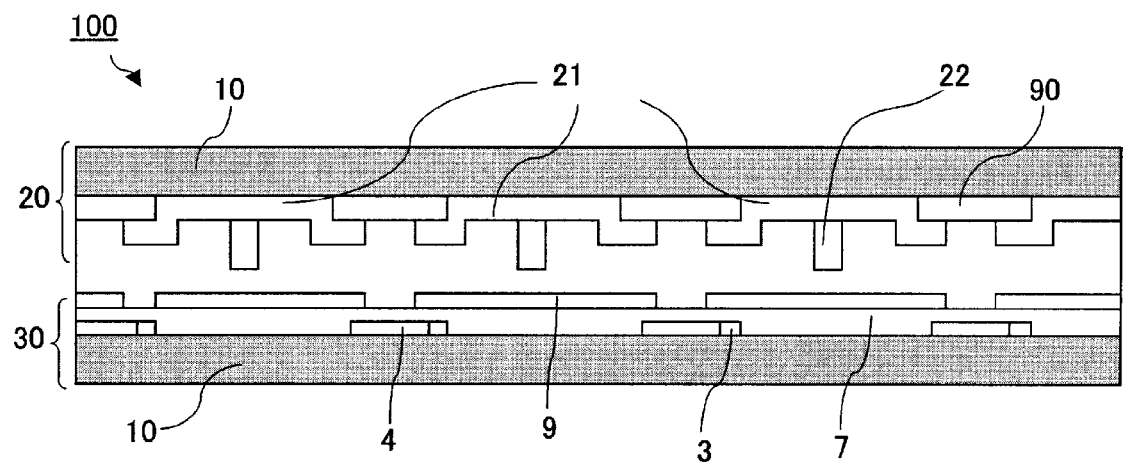
FIG. 2 is a sectional view showing schematically a liquid crystal display according to the embodiment 1.

FIG. 2 is a sectional view showing schematically a liquid crystal display unit according to an embodiment 1. As shown in FIG. 2, the liquid crystal display unit 100 contains a pair of substrates (substrate for liquid crystal display) opposed to each other. And plastic beads or columnar resin structures provided on a color filter substrate 20 or the like is used as a spacer (not shown), whereby space between the substrates is maintained constant. The liquid crystal display unit 100 is an active matrix type liquid crystal display unit wherein the pair of substrates opposed to each other is composed of the color filter substrate 20 and an active matrix substrate 30 having a switching device such as a thin film transistor (hereinafter referred optionally to as "TFT").

FIG. 1 is a plan view showing schematically a part (two pixels) of a liquid crystal panel according to the embodiment 1 wherein reference numeral 90 designates a black matrix (BM) and 22 an alignment control projection in the color filter substrate 20, respectively, and reference numeral 1 designates a wiring for scanning signals (gate wiring), 2 a wiring for storage capacitors, 4 a wiring for data signals (source wiring), 9 a pixel electrode pattern, and 8 a contact hole for joining electrically the pixel electrode pattern 9 to a drain wiring (not shown) in the active matrix substrate 30, respectively.

A method for manufacturing the active matrix substrate 30 is as follows. First, a metallic film such as a Ti/Al/Ti laminate film is deposited on a transparent substrate 10 by means of sputtering, then, a resist pattern is formed thereon in accordance with a photolithography method, and the resulting resist is dry-etched by using an etching gas such as a chlorine-based gas to exfoliate the resist, whereby a wiring for scanning signals (gate wiring) 1 and a wiring for storage capacitors 2 are formed at the same time. Thereafter, a gate insulator made of silicon nitride ($SiN_x$) and the like, an active semiconductor layer made of amorphous silicon and the like, and a low resistance semiconductor made of an amorphous silicon doped with phosphorous and the like are deposited in accordance with a CVD (Chemical Vapor Deposition) method. Then, a metallic film of Al/Ti and the like is deposited by means of sputtering, and thereafter, a resist pattern is formed in accordance with a photolithography method, and dry-etched by using an etching gas such as chlorine-based gas and the like to exfoliate the resist, whereby the wiring for data signals (source wiring) 4, a drain drawing wiring (not shown), and an electrode for forming storage capacitor (not shown) are formed at the same time. A storage capacitor is formed by sandwiching a gate insulating film having about 4000 angstrom thickness in between the wiring for storage capacitors 2 and the electrode for forming storage capacitor. Thereafter, for the sake of separating between a source and a drain, the low resistance semiconductor layer is dry-etched by using chlorine gas and the like to form a TFT device 3.

Then, an acryl-based photosensitive resin or the like solution is applied in accordance with a spin coat method to form an interlayer insulating film 7 having about 3 μm thickness, and the contact hole 8 for allowing the drain drawing wiring to be electrically in contact with the pixel electrode 9 is formed in accordance with a photolithography method. Furthermore, the pixel electrode 9 and an alignment film (not shown) are formed in this order. The liquid crystal display unit according to the present embodiment is a MVA type liquid crystal display unit wherein a slit pattern 11 is provided in the pixel electrode 9 made of ITO (Indium Tin Oxide) and the like. The pixel electrode pattern 9 is formed specifically by depositing an ITO film or the like in accordance with a sputtering method, and after a resist pattern is formed in accordance with a photolithography method, etching the resist pattern with an etching solution containing ferric chloride and the like. A manner for forming an orientation film will be mentioned later. As described above, the active matrix substrate 30 is obtained.

In the color filter substrate 20, a color filter layer 21 composed of colored layers of three primary colors (red, green, and blue), the black matrix (BM) 90 and the like; counter electrodes (not shown), an alignment film (not shown), and the alignment control projections 22 are provided on the transparent substrate 10.

A method for manufacturing the color filter substrate 20 is as follows. First, an acryl-based photosensitive resin of a negative type into which carbon fine particles are dispersed is applied to the transparent substrate 10 in accordance with a spin coat method, and then dried to form a black photosensitive resin layer. In succession, the black photosensitive resin layer is exposed through a photomask, and then, developed to form the black matrix layer (BM) 90. In this case, the BM 90 is formed such that an opening for a first colored layer (for example, red layer), an opening for a second colored layer (for example, green layer), and an opening for a third colored layer (for example, blue layer) (the respective openings correspond to respective pixel electrodes) are formed in areas in which the first, second, and third colored layers are defined, respectively; besides, the BM 90 is not formed at a site opposed to the storage capacitor wiring 2, but slits are provided in the BM 90 formed at a site opposed to the gate wiring 1. Specifically, the BM pattern 90 for light-shielding an abnormal alignment area appeared on an electrical connection part of the pixel electrode 9 having slits 23 is formed in island-shape, while the BM (light-shield portion) 90 is also formed on the TFT device 3 in order to prevent increase in an OFF electric current excited optically by inputting an external light to the TFT device 3 (the illustration is omitted in FIG. 1).

Then, an acryl-based photosensitive resin solution of a negative type into which a pigment is dispersed is applied in accordance with a spin coat method, then, dried, exposed by using a photomask, and developed to form the first colored layer (for example, the red layer). Thereafter, the second colored layer (for example, the green layer) and the third colored layer (for example, the blue layer) are formed by the same manner as that of the first colored layer, whereby the color filter layer 21 is completed.

In the present embodiment, the BM having 1.6 µm film thickness, and the first to the third colored layers each having 1.8 µm film thickness were formed.

Furthermore, a transparent electrode (not shown) made of ITO or the like is formed by means of sputtering, and thereafter, a phenolic novolak-based photosensitive resin solution of a positive type is applied in accordance with a spin coat method, dried, exposed by using a photomask, and developed to form vertical alignment control projections 22. Conditions for forming the projections in this case are 600 rpm rotational frequency and 30 mJ/cm$^2$ exposure value in the spin coating, and each 1.5 µm film thickness of the alignment control projections 22. In the case when the alignment control projections 22 are formed, a slit 23 is provided at a site opposed to the gate wiring 1 as shown in FIG. 1. The slit 23 achieves such advantageous functions of providing a passage for spreading sufficiently a dropped liquid crystal into a cell, so that it prevents an appearance of defective air bubbles.

In the embodiment 1, although two slits 23 per a pixel are provided with respect to the alignment control projection 22 located at a site opposed to the gate wiring 1, a configuration of the number, a width and the like of the slits are not specifically limited, but when at least one slit 23 per a pixel is provided, advantages of the invention can be sufficiently attained. It is preferred that the configuration of the slit 23 is suitably determined so as to be capable of hiding an abnormal alignment portion in a liquid crystal layer due to a positional relation with respect to the pixel electrode 9. Moreover, it is preferred to assure a wide area within a permissible range from a designable point of view.

According to the manner as described above, the color filter substrate 20 for suppressing a generation of vacuum air bubbles due to insufficient extension of a liquid crystal with respect to a drop filling method may be formed.

In a method for manufacturing a liquid crystal panel, a degasification treatment prior to alignment film coating is made by burning the active matrix substrate 30 and the color filter substrate 20 formed as mentioned above at 210° C. for 60 minutes, then, these substrates are washed, and alignment film coating is carried out. After the alignment film coating, the alignment film is burned as alignment film burning at 200° C. for 40 minutes. After coating the alignment film, it was washed, and then, burned further at 200° C. for 50 minutes as a degasification treatment. In these steps, a generation of air bubbles due to adsorption water and the like can be prevented by the degasification treatment.

Next, a UV (ultraviolet) hardenable type sealing resin is applied around a periphery of the active matrix substrate 30, and a liquid crystal is dropped on the color filter substrate 20 in accordance with a drop filling method. A panel size of a liquid crystal panel used is 32 inch type WXGA (Wide eXtended Graphics Array: 1366×RGB×768 dot) wherein a liquid crystal is dropped with the optimum amount such that a cell gap of the liquid crystal becomes 3.7 µm. Specifically, a dropping amount per a drop is 1.17 mg, a point to be dropped is 760 drops, and a total amount of liquid crystal to be dropped is 889.256 mg. Under the condition specified, the liquid crystal is regularly dropped on an area inside a seal. Moreover, the color filter substrate 20 to which the seal has been drawn and the liquid crystal has been dropped is bonded to the active matrix substrate 30 wherein an atmosphere in a bonding device is reduced to 1 Pa, and they are bonded under this reduced pressure. Thereafter, this reduced atmosphere is returned to the atmosphere, so that the sealed part is crushed thereby to obtain a desired gap in the sealed part. Then, UV is irradiated on a structural body containing a desired cell gap in the sealed part by means of a UV hardening device to harden tentatively a sealing resin. In this case, an irradiation condition of UV is 2000 mJ/cm$^2$.

Furthermore, the seal resin is baked at 130° C. for 70 minutes to harden finally the sealing resin. At that time, the liquid crystal spreads over inside the sealing resin, resulting in a state wherein each interior of the cells are charged with the liquid crystal. After completing the baking, the resulting structural body is cut into a liquid crystal panel unit, whereby a liquid crystal panel is completed.

When a driving circuit and the like are connected to the resulting liquid crystal panel according to needs, a liquid crystal display unit may be obtained.

In the liquid crystal display fabricated as mentioned above, since the liquid crystal dropped spreads sufficiently into cells, neither remaining vacuum air bubble is produced, nor there is a decrease in a display quality due to abnormal alignment of the liquid crystal. Accordingly, a good display quality can be achieved.

Embodiments 2 to 5

FIGS. 3 to 6 are plan views showing schematically a part of each of liquid crystal panels according to embodiments 2 to 5 of the present invention.

Figure 3:
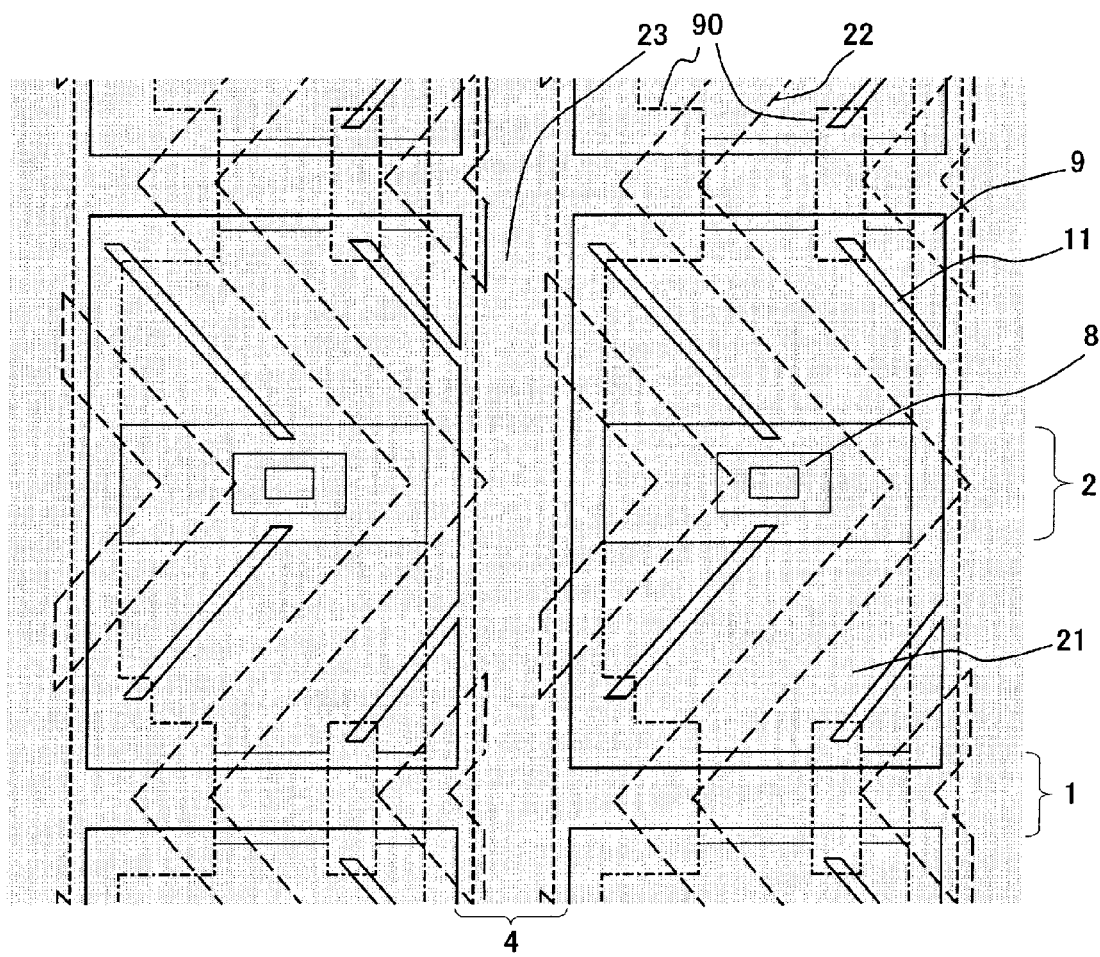
FIG. 3 is a plan view showing schematically a part of a liquid crystal panel according to an embodiment 2.
Figure 4:
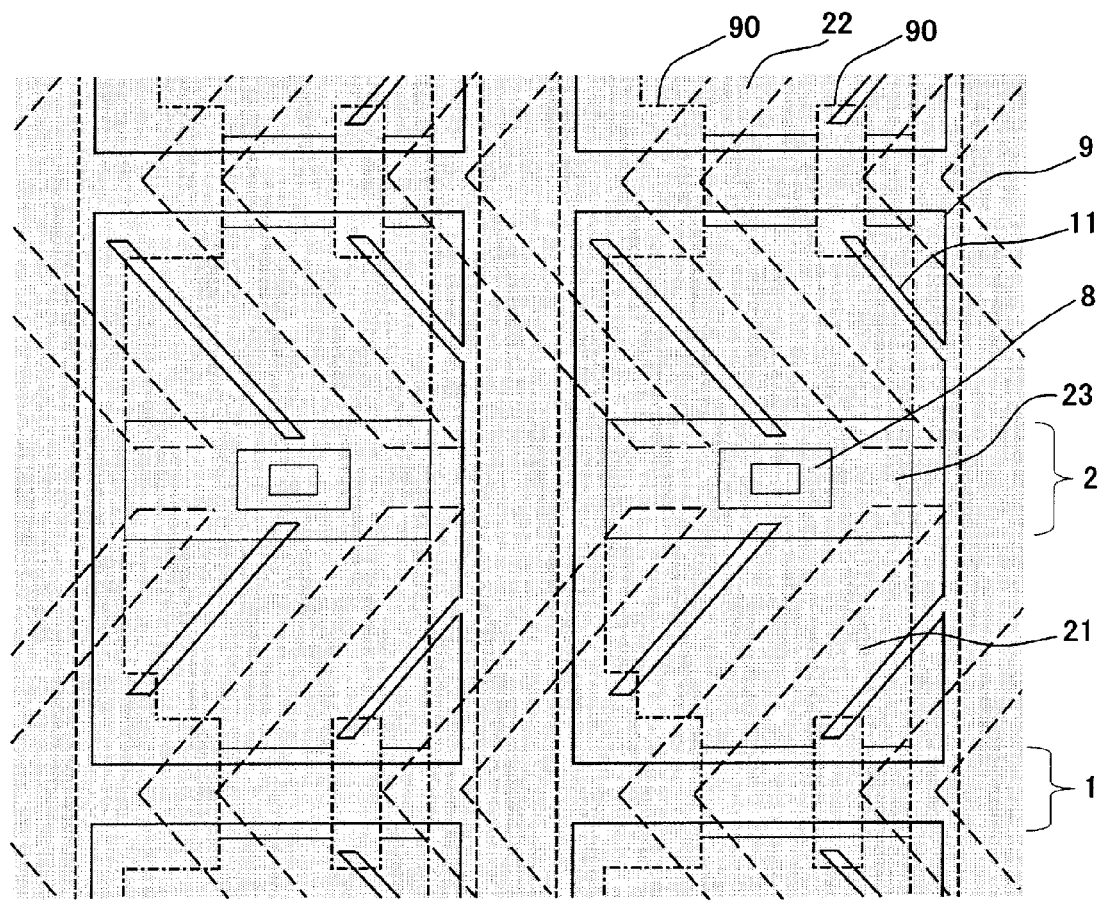
FIG. 4 is a plan view showing schematically a part of a liquid crystal panel according to an embodiment 3 of the present invention.
Figure 5:
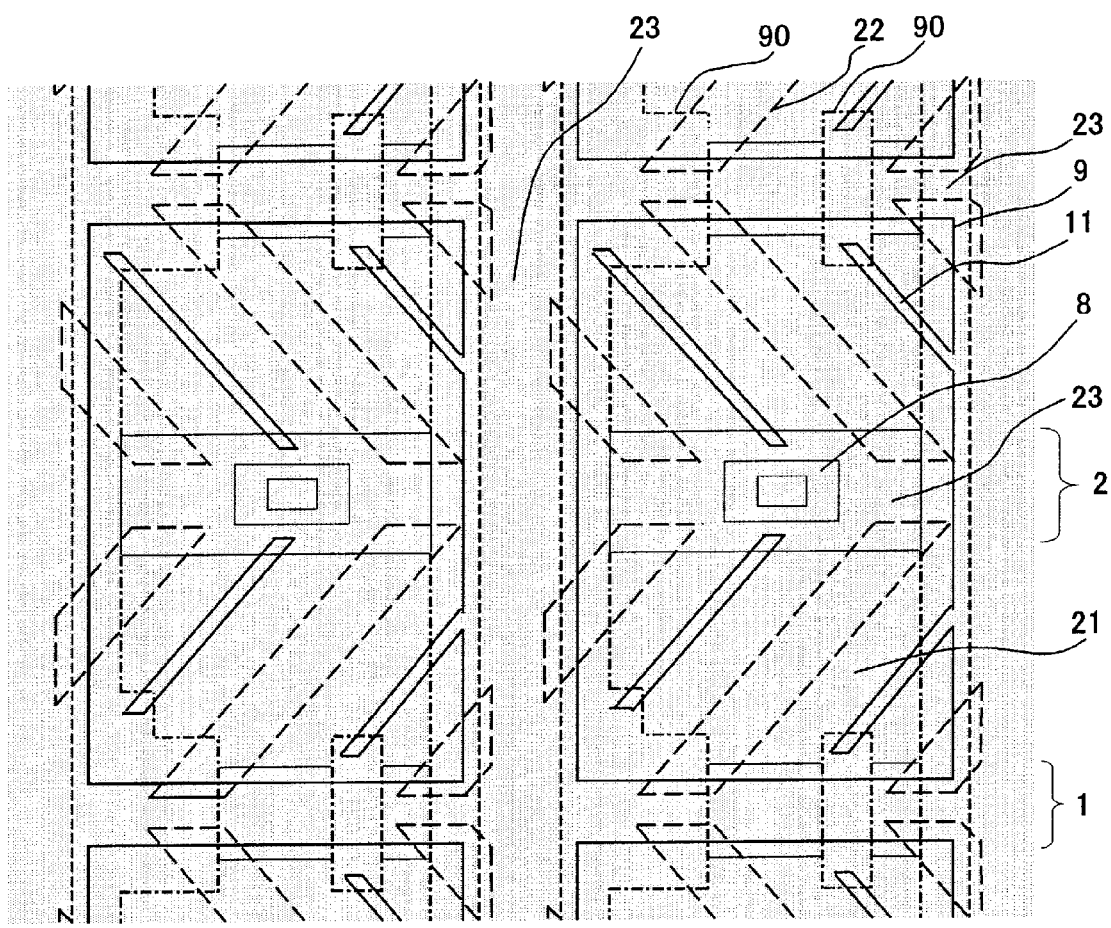
FIG. 5 is a plan view showing schematically a part of a liquid crystal panel according to an embodiment 4 of the present invention.
Figure 6:
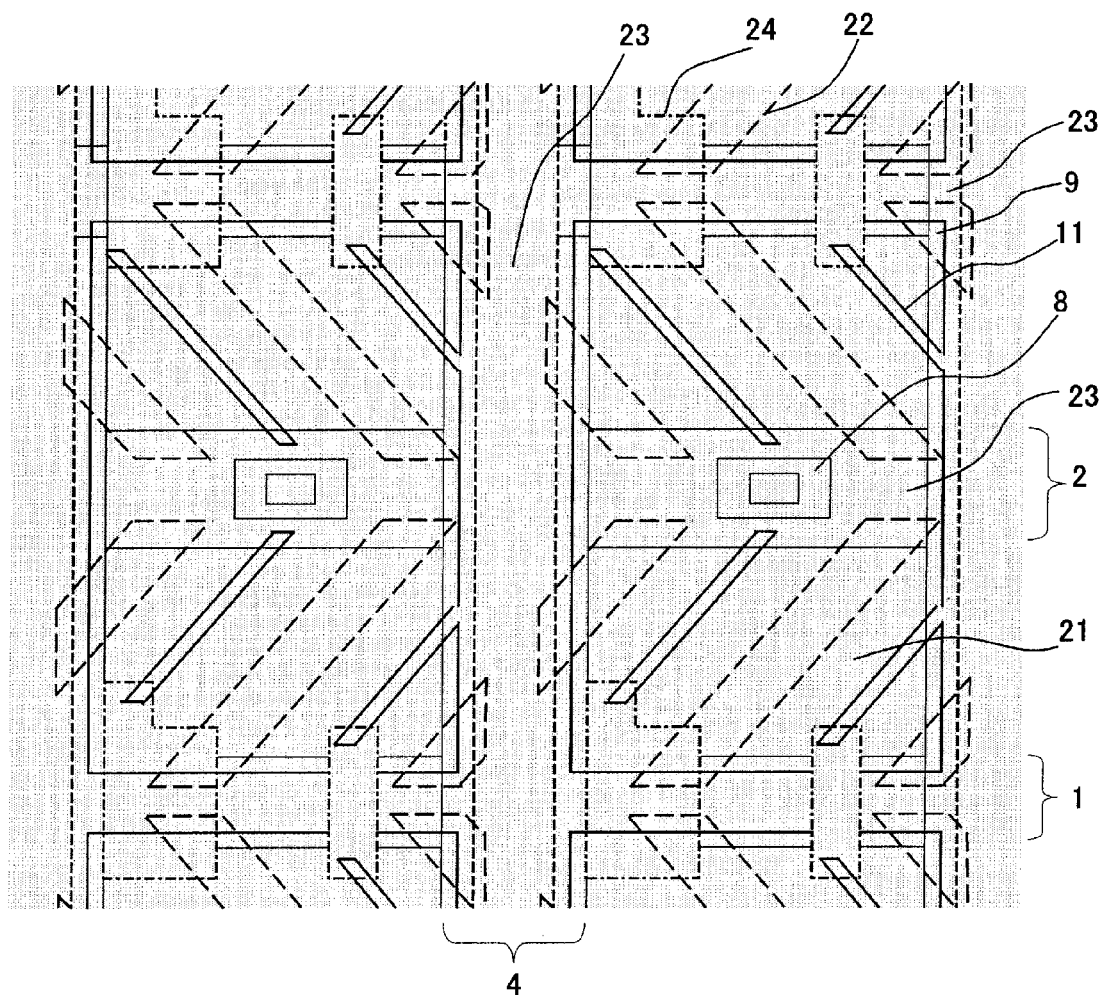
FIG. 6 is a plan view showing schematically a part of a liquid crystal panel according to an embodiment 5 of the present invention.

In the embodiment 1, although the slits 23 are located only at the site opposed to the gate wiring 1, slits 23 are located at the site opposed to a source wiring 4 as shown in FIG. 3 in the embodiment 2. Moreover, slits 23 are located at the site opposed to a wiring 2 for storage capacitor as shown in FIG. 4 in the embodiment 3. Furthermore, slits 23 are located at the site opposed to a gate wiring 1, a source wiring 4, and a wiring 2 for storage capacitor as shown in FIG. 5 in the embodiment 4. In addition, a color filter substrate 20 has a structure containing no BM as shown in FIG. 6 in the embodiment 5. Thus, it becomes possible to increase a panel aperture ratio, and there is no overlapped portion between the BM 90 and a colored layer, so that a barrier becomes lower, whereby advantageous effects of extending easily a liquid crystal can be achieved. In the embodiment 5, an overlapped color light-shielding region 24 composed of at least two layers is disposed on a TFT device 3 (an illustration is omitted in FIG. 6) as a light-shielding section for preventing an increase of an OFF electric current excited optically due to incidence of an external light into the TFT device 3.

Also in the embodiments as enumerated above, a color filter substrate 20 for preventing a generation of vacuum air bubbles due to insufficient extension of a liquid crystal with respect to a drop filling method is obtained.

The Other Embodiments

Although a mode wherein the BM 90 is formed from a resin is described in the above-mentioned embodiments, the same effects of the present invention can be obtained in another mode wherein the BM is formed from a metal.

Furthermore, in the above-mentioned embodiments, slits are provided on the pixel electrode 9 of the active matrix substrate 30, while alignment control projections 22 are provided on the side of a color filter substrate 20 in order that a pre-tilt is provided with respect to vertical alignment type liquid crystal molecules of the liquid crystal to be charged in between substrates. However, there may be a mode wherein the slits and the alignment control projections are provided on the substrates being in reverse to each other.

Besides, also in a MVA type liquid crystal display wherein alignment control projections are provided on electrode surfaces of both the substrates, when the same slits as that of the embodiments as mentioned above are provided, extension of liquid crystal becomes better, so that remaining vacuum air bubbles can be suppressed.

Comparative Example 1

Figure 7:
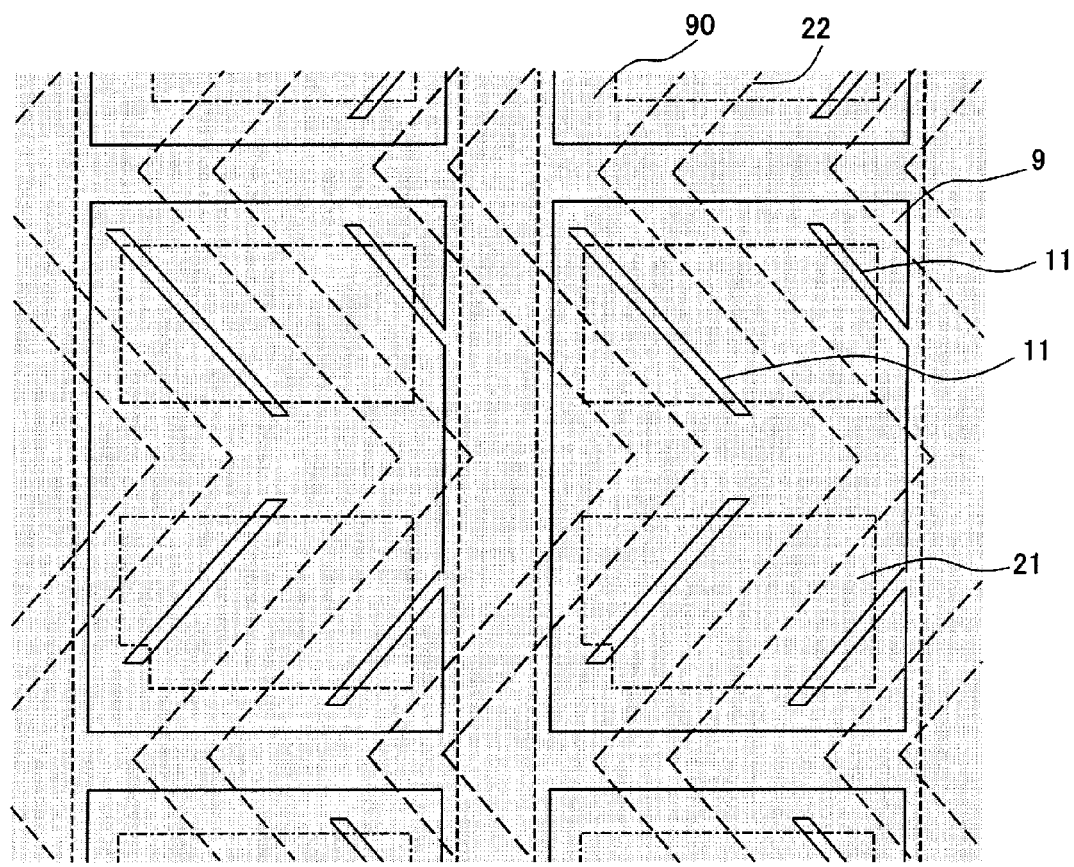
FIG. 7 is a plan view showing schematically a part of a liquid crystal panel according to a comparative example 1 of the present invention.

As an comparative example 1, a part of a conventional liquid crystal panel is shown in FIG. 7 wherein there is a mode in which alignment control projections 22 are connected continuously, whereby the alignment control projection 22 become barriers, so that the liquid crystal dropped does not spread sufficiently into a screen, and areas where no liquid crystal exist are produced, resulting in defective vacuum air bubbles.

This Nonprovisional application claims priority under U.S.C §119(a) on Patent Application No. 2004-160116 filed in Japan on May 28, 2004, the entire contents of which are hereby incorporated by reference.

The invention claimed is:

1. A liquid crystal display unit, comprising:
a first substrate;
a second substrate opposed to the first substrate;
liquid crystals interposed between the first substrate and the second substrate;
projections provided in at least one of the first substrate and the second substrate and arranged to control alignments of the liquid crystals;
a wiring provided in at least one of the first substrate and the second substrate and arranged to intersect with the projections; wherein
at least two gaps are provided in portions of the projections, the at least two gaps are located at intersections of the projections with the wiring, and the at least two gaps are arranged in a row along the wiring; and
two ends of the at least two gaps are located within a region overlapping the wiring.

2. The liquid crystal display unit according to claim 1, wherein:
the projections divide respective pixel electrodes into two or more areas viewed from the direction vertical to the surfaces of the first substrate and the second substrate.

3. The liquid crystal display unit according to claim 1, wherein:
the projections have a repeated V-shaped configuration viewed from the direction vertical to the surfaces of the first substrate and the second substrate.

4. The liquid crystal display unit according to claim 1, wherein:
the at least two gaps are provided in a portion of the projection substantially overlapping a black matrix viewed from the direction vertical to surfaces of the first substrate and the second substrate.

5. The liquid crystal display unit according to claim 1, wherein:
the first substrate is a color filter substrate containing colored color filter layers of at least three primary colors.

6. The liquid crystal display unit according to claim 1, wherein:
the second substrate is an active matrix substrate.

7. A method for manufacturing the liquid crystal display unit of claim 1 wherein:
the method comprises the steps of:
applying an ultraviolet cure sealing resin along a periphery of one of the first substrates and the second substrate;
dropping liquid crystals on the one of the first substrate and the second substrate with the ultraviolet cure sealing resin applied thereon;
bonding the first substrates and the second substrate; and
irradiating ultraviolet ray to cure the sealing resin.

8. The liquid crystal display unit according to claim 1, wherein the projections are arranged linearly.

9. The liquid crystal display unit according to claim 1, wherein the at least one wiring is selected from the group consisting of a wiring for scanning signals, a wiring for data signals, and a wiring for storage capacitors.

\* \* \* \* \*